United States Patent
Watson

(10) Patent No.: US 7,232,170 B2
(45) Date of Patent: Jun. 19, 2007

(54) SIDE OPENING CARGO RACK

(75) Inventor: Brad E. Watson, Sharin (CA)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 11/311,512

(22) Filed: Dec. 19, 2005

(65) Prior Publication Data

US 2006/0163298 A1     Jul. 27, 2006

Related U.S. Application Data

(60) Provisional application No. 60/646,132, filed on Jan. 21, 2005.

(51) Int. Cl.
*B60P 3/34* (2006.01)
(52) U.S. Cl. .................... 296/26.01; 224/310
(58) Field of Classification Search ............ 296/26.01; 224/517, 516, 513, 309, 310, 504, 311
See application file for complete search history.

(56) References Cited

U.S. PATENT DOCUMENTS

| | | | | |
|---|---|---|---|---|
| 3,193,124 | A * | 7/1965 | Essling ................... 224/310 |
| 3,531,006 | A * | 9/1970 | Farchmin ................ 414/462 |
| 3,921,869 | A * | 11/1975 | Rogers ................... 224/500 |
| 4,063,774 | A | 12/1977 | Hanks |
| 4,291,823 | A * | 9/1981 | Freeman et al. ........... 224/310 |
| 4,335,840 | A * | 6/1982 | Williams ................. 296/91 |
| 4,728,244 | A * | 3/1988 | Stokkendal .............. 224/319 |
| 5,065,921 | A * | 11/1991 | Mobley .................. 224/493 |
| 5,676,291 | A | 10/1997 | Wolf et al. |
| 5,690,259 | A * | 11/1997 | Montani ................. 224/310 |
| 5,765,737 | A | 6/1998 | Cucheran et al. |
| 5,855,840 | A | 1/1999 | Cucheran et al. |
| 5,904,463 | A * | 5/1999 | Christensen ............. 224/310 |
| 5,965,654 | A | 10/1999 | Hirata et al. |
| 6,015,074 | A * | 1/2000 | Snavely et al. ........... 224/310 |
| 6,279,801 | B1 | 8/2001 | Harrison |
| 6,308,874 | B1 * | 10/2001 | Kim et al. ............... 224/310 |
| 6,338,428 | B1 | 1/2002 | Kawasaki et al. |
| 6,427,888 | B1 | 8/2002 | Condon et al. |
| 6,516,984 | B1 * | 2/2003 | Kmita et al. ............. 224/310 |
| 6,715,652 | B2 | 4/2004 | Kmita et al. |
| 6,761,296 | B2 * | 7/2004 | Ford et al. .............. 224/310 |
| 6,827,244 | B1 * | 12/2004 | Stapleton et al. ......... 224/310 |
| 6,866,175 | B2 * | 3/2005 | Munoz et al. ............ 224/324 |
| 6,866,335 | B2 * | 3/2005 | Tolinski et al. ........... 296/217 |
| 7,011,239 | B2 * | 3/2006 | Williams ................ 224/310 |
| 2002/0014504 | A1 * | 2/2002 | Hetu .................... 224/310 |
| 2003/0201288 | A1 | 10/2003 | Ford et al. |
| 2006/0060623 | A1 * | 3/2006 | Huang ................... 224/504 |

* cited by examiner

*Primary Examiner*—Kiran B. Patel
(74) *Attorney, Agent, or Firm*—Clark Hill PLC

(57) ABSTRACT

A rack assembly secures articles to a motor vehicle having a liftgate. The liftgate defines a predetermined liftgate with, a bumper and a roof rack. The rack assembly includes first and second base mounts that are fixedly secured to the bumper. The rack assembly also includes first and second rack mounts that are fixedly secured to the roof rack. The rack assembly also includes a mounting rack that is pivotally secured to the first base mount and the first rack mount and removeably securable to the second base mount and second rack mount. The mounting rack provides securing devices for securing articles thereto.

2 Claims, 2 Drawing Sheets

SIDE OPENING CARGO RACK

RELATED APPLICATION

This application claims priority to and all the benefits of U.S. Provisional Patent Application No. 60/646,132, filed on Jan. 21, 2005.

BACKGROUND OF THE INVENTION

1. Field of the Invention

The invention relates to rack assemblies for mounting items to an exterior of a motor vehicle. More specifically, the invention relates to a rack assembly for securing items to a motor vehicle having a liftgate.

2. Description of the Related Art

Rack assemblies mounted to motor vehicles are well known in the art. Rack assemblies have been used to mount and secure articles to the exterior of the motor vehicles and are almost as old as the motor vehicle itself. The rack assembly is used to help secure articles in such a manner that they do not shift while the motor vehicle is in operation. In addition, the rack assembly protects the exterior finish of the motor vehicle by preventing the articles being secured thereto from contacting and rubbing against the finish of the motor vehicle.

As motor vehicles get larger with the popularity of the sport utility vehicle, rack assemblies become more and more difficult to load and unload. This is because the height of the sport utility vehicle is typically higher than that of a sedan, station wagon or sport car. The issue of height clearance is greater when the articles being attached to the top of a sport utility vehicle are tall, such as bicycles. A common solution for this problem is to mount the rack assembly to the back side of the sport utility vehicle. This presents problems because access to the liftgate is prevented unless the rack assembly is unloaded and dismounted from the motor vehicle. And there are times when it is desired to access a rear liftgate without unloading or dismounting the rack assembly that covers the liftgate.

SUMMARY OF THE INVENTION

A rack assembly secures articles to a motor vehicle having a liftgate, a bumper and a roof rack. The liftgate defines a predetermined liftgate width. The rack assembly includes first and second base mounts that are fixedly secured to the bumper. The rack assembly also includes first and second rack mounts that are fixedly secured to the roof rack. The rack assembly also includes a mounting rack that is pivotally secured to the first base mount and the first rack mount and removably securable to the second base mount and second rack mount. The mounting rack provides securing devices for securing articles thereto.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
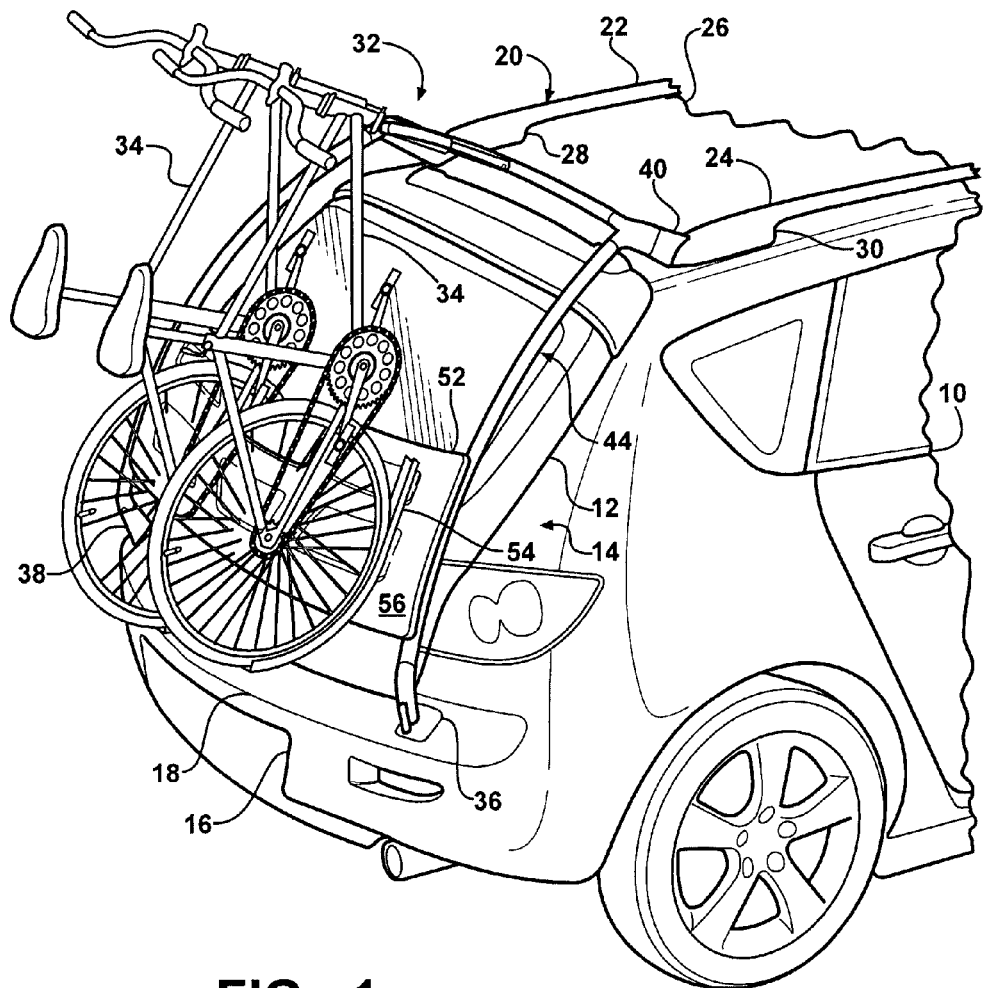
FIG. 1 is a fragmentary perspective view of a back end of a sport utility vehicle with one embodiment of the invention having articles mounted thereto.

Referring to FIG. 1, a motor vehicle 10 is shown partially cut away. The motor vehicle 10 is shown as a sport utility vehicle. It should be appreciated by those skilled in the art that the motor vehicle 10 may be any type of motor vehicle that includes a liftgate 12 or a tailgate providing access to an interior of the motor vehicle 10 from a back end, generally indicated at 14, of the motor vehicle 10. The liftgate 12 has a liftgate width which extends along much of the width of the motor vehicle 10.

The motor vehicle 10 includes a bumper 16 extending along the width of the motor vehicle 10 below the liftgate 12. The bumper 16 defines a top surface 18 that is generally perpendicular to the back end 14 of the motor vehicle 10.

The motor vehicle 10 also includes a roof rack, generally indicated at 20. The roof rack 20 includes two side rails 22, 24 that extend along the sides of the motor vehicle 10. The side rails 22, 24 are mounted to a roof 26 of the motor vehicle at a front end (not shown) and at a liftgate end 28, 30.

Figure 2:
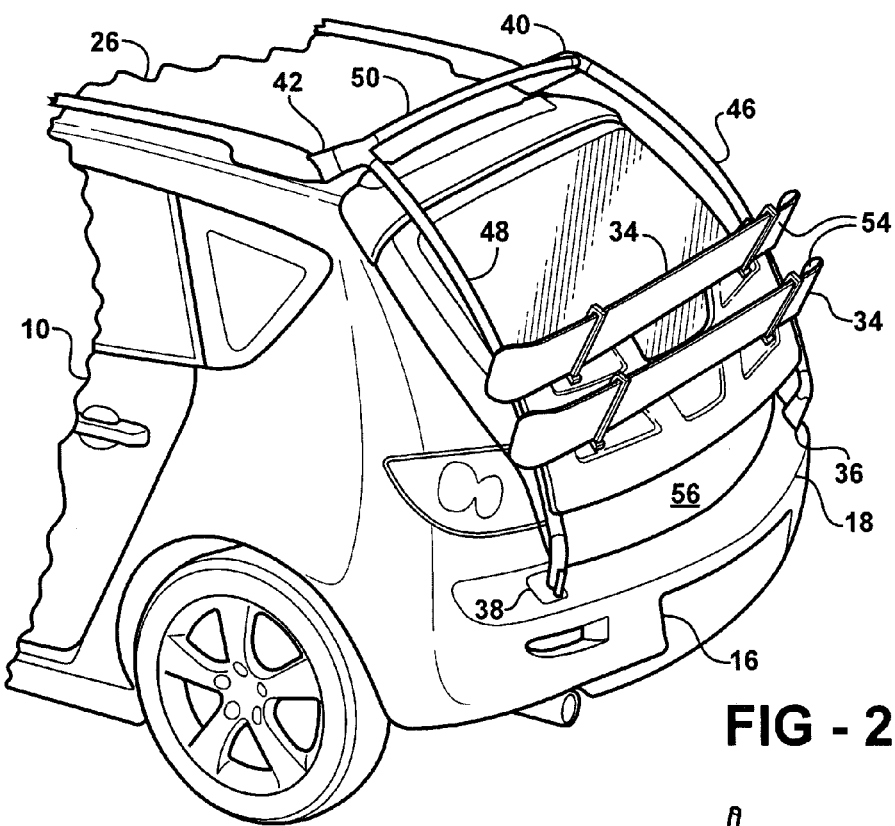
FIG. 2 is a fragmentary perspective view of a sport utility vehicle with one embodiment of the invention in a closed position.
Figure 3:
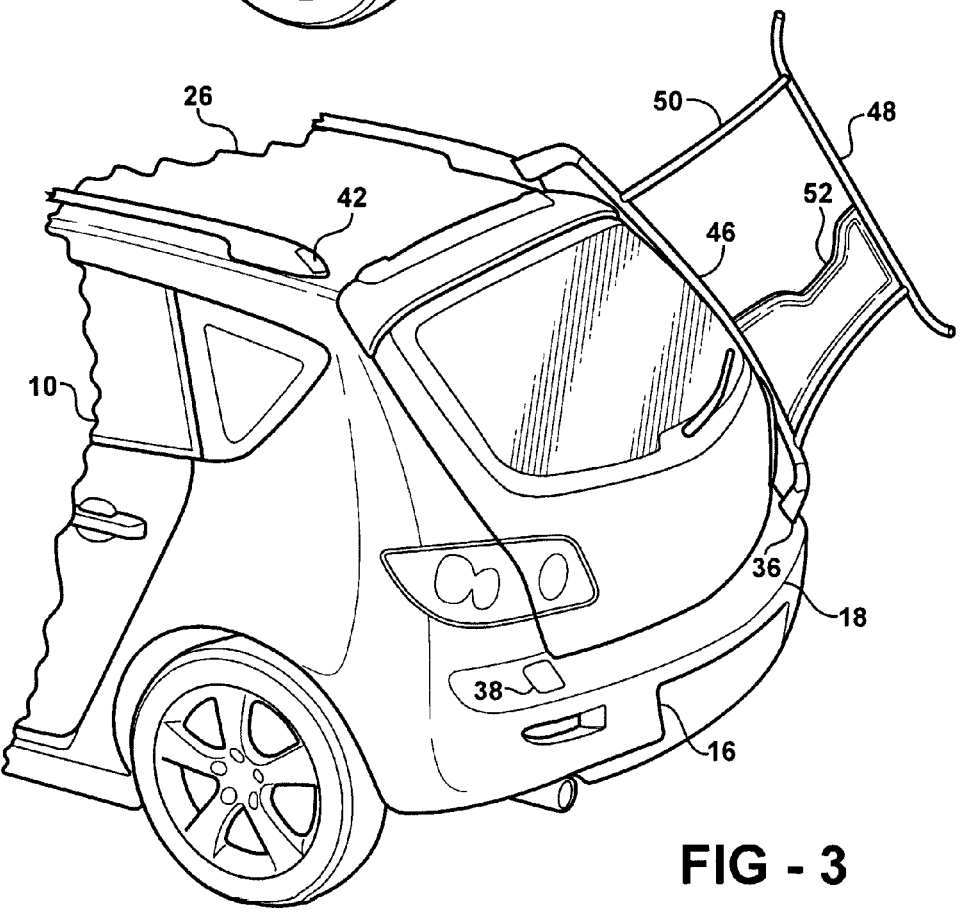
FIG. 3 is fragmentary perspective view of a sport utility vehicle with the invention in an open position.

The invention, a rack assembly, is generally shown at 32. The rack assembly 32 is designed to secure articles 34 to the motor vehicle 10. As is shown in FIGS. 1 and 2, the articles 34 are bicycles and snowboards, respectively. It should be appreciated by those skilled in the art that the articles 34 may be any type of article that is required to be secured to an exterior of a motor vehicle 10. The rack assembly 32 includes first 36 and second 38 base mounts. The first and second base mounts 36, 38 are fixedly secured to the top surface 18 of the bumper 16. The first and second base mounts 36, 38 are separated by a distance greater than the width of the liftgate 12.

The rack assembly 32 also includes first 40 and second 42 rack mounts. The rack mounts 40, 42 are fixedly secured to each of the liftgate ends 28, 30 of the side rails 22, 24. Therefore, the first 40 and second 42 rack mounts are mounted above the roof 26 of the motor vehicle 10. This prevents possible corrosion to the finish of the roof 26 and provides clearance for the liftgate 12 discussed subsequently. Should the motor vehicle 10 not include a roof rack 20, the rack mounts 40, 42 may be fixedly secured directly to the motor vehicle 10.

The rack assembly 32 also includes a mounting rack, generally indicated at 44, that is pivotally secured to the first base mount 36 and the first rack mount 40. The mounting rack 44 is removably secured to the second base mount 38 and the second rack mount 42. The mounting rack 44 includes two liftgate members 46, 48 that extend between the first base mount 36 and first rack mount 40 and between the second base mount 38 and the second rack mount 42, respectively. The rack assembly 32 also includes a cross beam 50 that extends between the rack mounts 40, 42. A mounting plate 52 also extends between the two liftgate members 46, 48. The mounting plate 52 includes hardware 54 to mount articles 34 thereto. As may be seen between FIGS. 1 and 2, the mounting hardware 54 may be replaced by differently configured hardware to accommodate for differently shaped articles 34.

The liftgate member 48 is selectively removable from the second base mount 38 and the second rack mount 42. More specifically, the second liftgate member 48 may be unlatched from the second base mount 38 and the second rack mount 42 allowing it to be removed therefrom. When the second liftgate member 48 is unlatched or unlocked, the mounting rack 44 may be pivoted about the first base mount 36 and the first rack mount 40 away from the liftgate 12. By allowing the mounting rack 44 to pivot away from the liftgate 12, access to the interior of the motor vehicle 10 through the liftgate 12 may occur without having to remove the rack assembly 32 from the motor vehicle 10. And depending on the type of article 34 mounted to the mounting rack 44, the mounting rack 44 may be pivoted away from the liftgate 12 without unloading the mounting rack 44, further facilitating an operator of the motor vehicle 10 and providing access to the interior of the motor vehicle 10 through the liftgate 12.

The mounting rack 44 defines a surface 56 that extends along a portion of the length of the first 46 and second 48 liftgate members. The increased width of the surface of the mounting rack 44 allows for different types of mounting hardware 54 to be used when attaching articles 34 thereto. This increases the flexibility of the rack assembly 32 to have several different types of articles 34 mounted thereto. The surface 56 does not create any disadvantage in an aerodynamic sense because it is close enough to the liftgate 12 that when the motor vehicle 10 is being operated, there is little turbulence generated by the existence of the mounting rack 44 having such a surface 56.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A rack assembly for securing articles to a motor vehicle having a liftgate, defining a predetermined liftgate width, a bumper and a roof rack, said rack assembly comprising:

first and second base mounts fixedly secured to the bumper;

first and second rack mounts fixedly secured to the roof rack; and a mounting rack pivotally secured to said first base mount and said first rack mount and removably securable to said second base mount and said second rack mount, said mounting rack providing securing devices for securing the articles thereto.

2. A rack assembly as set forth in claim 1 wherein said first and second rack mounts are fixedly secured to a roof of the motor vehicle.

* * * * *